(12) United States Patent
Gomes de Oliveira et al.

(10) Patent No.: US 6,802,978 B2
(45) Date of Patent: Oct. 12, 2004

(54) PROCESS FOR ENVIRONMENTAL RECOVERY IN URBAN REGIONS

(76) Inventors: João Carlos Gomes de Oliveira, Al Campinas, 368, Sociedade Alphaville Residencial IV-CEP 06486110, Barueri (BR); Elizabeth Maniero Gomes de Oliveira, Al Campinas, 368-CEP 06486-110, Santana de Parnaíba (BR)

( * ) Notice: Subject to any disclaimer, the term of this patent is extended or adjusted under 35 U.S.C. 154(b) by 104 days.

(21) Appl. No.: 10/167,089

(22) Filed: Jun. 10, 2002

(65) Prior Publication Data

US 2003/0085176 A1 May 8, 2003

(30) Foreign Application Priority Data

Nov. 6, 2001 (BR) .................................................. 105462

(51) Int. Cl.[7] .............................. C02F 1/24; C02F 1/52; C02F 7/00; E02B 15/04; E02B 15/10
(52) U.S. Cl. ........................ 210/703; 210/747; 210/170
(58) Field of Search ............................... 210/703, 747, 210/170, 726

(56) References Cited

U.S. PATENT DOCUMENTS 3,470,091 A * 9/1969 Budd et al.
3,693,796 A * 9/1972 Michel et al.
3,884,810 A * 5/1975 Smyrnow

* cited by examiner

Primary Examiner—Thomas M. Lithgow
(74) Attorney, Agent, or Firm—Blakely, Sokoloff, Taylor & Zafman

(57) ABSTRACT

A process of environmental including a micro application of floating/coagulating material in the watercourse, followed by micro flocculation to aggregate particles in suspension downstream, defining flakes of greater dimensions; submit the aggregated particles, dissolution and air injection, causing a micro floatation of aggregated particles; allowing a micro aggregation of the floating material downstream; next, the flow water is thrown into a streamlet/secondary effluent, submitted to air injection or aeration; a medium application of flocculating/coagulation material in this secondary watercourse to aggregate particles downstream, evidencing flakes of greater dimensions; submit aggregated particles downstream to dissolution and injection of air, submitting the urban watercourse to air injection or aeration intercalating, causing a macro floatation of aggregated particles and a macro aggregation of the floating material downstream; removing such material along an urban section before the effluent reaches the water dam for urban supply.

4 Claims, 2 Drawing Sheets

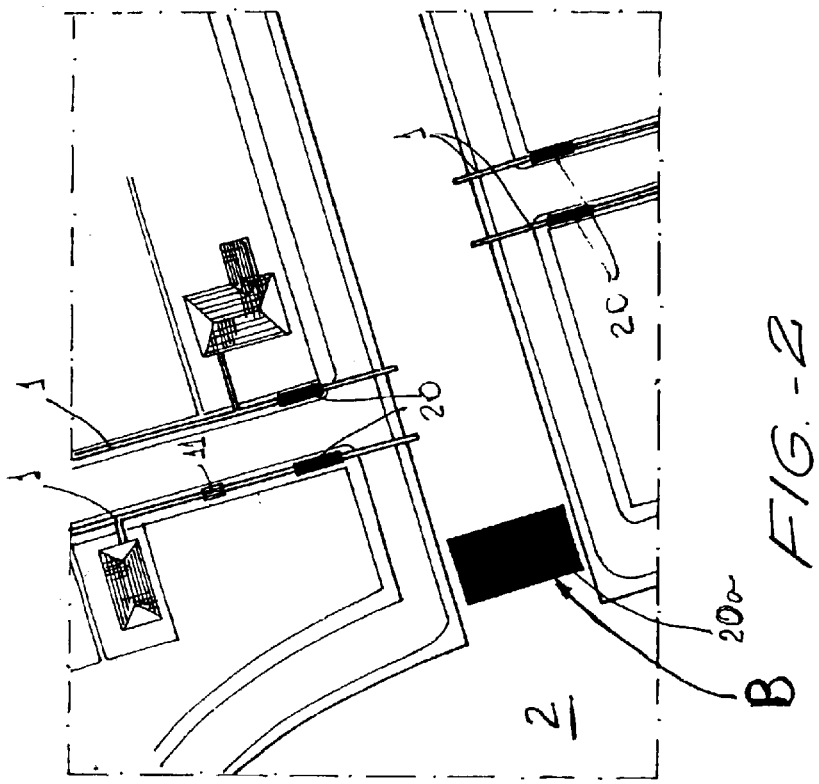
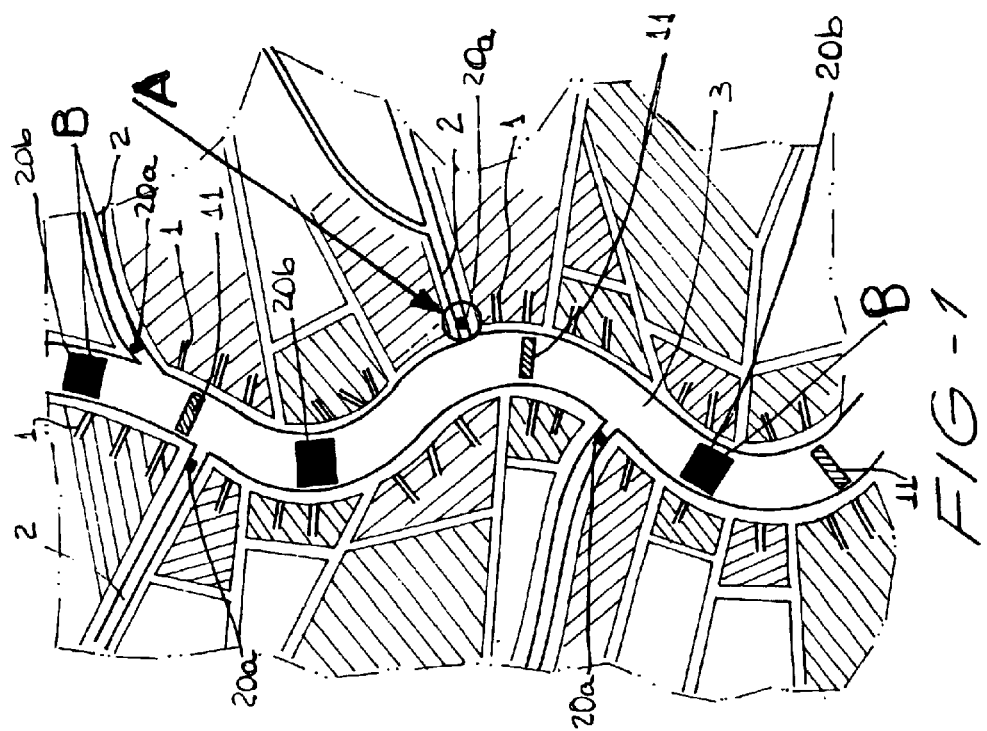

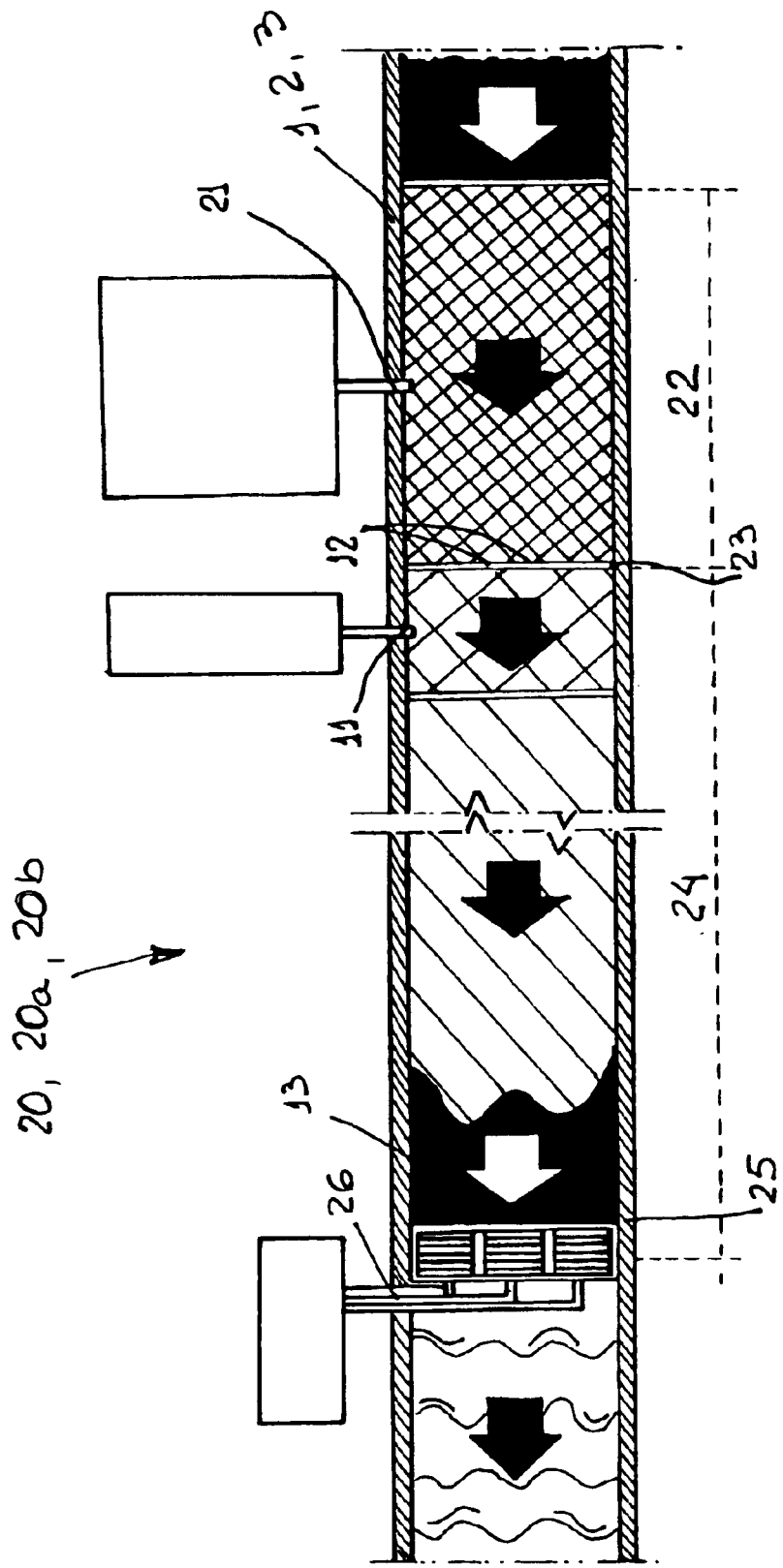

PROCESS FOR ENVIRONMENTAL RECOVERY IN URBAN REGIONS

BACKGROUND OF THE INVENTION

The present report refers to a process of environmental recovery in urban regions and, more specifically, to a process that allows micro, medium and macro-scale treatment throughout urban watercourses, thus affecting all watercourses of an urban region in a continuous and complementary manner, such as canalized watercourses that migrate towards streamlets; streamlets that migrate towards secondary and/or primary effluents; and throughout river effluents in their urban section.

As it is of common knowledge by the experts on this matter, pollution of watercourses and environment deterioration are currently preoccupying factors verified in great urban centers, and the increase of pollution levels is inherent to modern civilization.

The demographic formation, development and densification throughout riverbeds have been bringing about and/or deepening sanitation problems in such regions.

In this sense, the sanitary cast and deposition of residual waters and waste at high volumes in watercourses occur at a daily basis, which hinders the occurrence of the phenomenon so called auto-depuration. The consequence of this fact is the transformation of rivers, lakes and reservoirs of great urban centers into true outdoor sewers.

It is also known that studies conducted so far show that the reversion of such daily environmental deterioration demands large investments in an efficient public sewerage system that allows the quick and safe removal of residual waters, waste and liquid residual matter produced by human activity, as well as the development of treatment systems designed for such materials.

However, no matter the amount of resources obtained, the time for implementation of an efficient sanitation system these days is not compatible with the rapid growth of urban centers, specially in large metropolises, which makes it impossible to totally eliminate all of the problematic factors regarding the treatment and recovery of effluents.

SUMMARY OF THE INVENTION

One of the goals of this invention is to promote a process of environmental recovery in urban regions that acts throughout the entire watercourse mesh of an urban region in order to remove the present pollution, in domestic canalized sewerage streams and effluents cast without any treatment in urban riverbeds, as well as in rainwater streams where pollution is spread out.

Another goal of this invention is to promote a process of environmental recovery in urban regions that allows an improvement of sanitation conditions from the user to the effluent riverbed, allowing the implantation of a group of systems through which the removal of the existent pollution from the user to the watercourse will occur, enabling the elimination of non-esthetic aspects and bad odor, with the corresponding use of hydro resources for future reutilization.

Another goal of this invention is to promote a process of environmental recovery in urban regions that allows the utilization of urban watercourses in connection with entertainment and the practice of sports; the conservation of natural hydro resources against excessive pollution and its maintenance in full conditions in order to allow the full exploitation thereof. Another goal of this invention is to promote a process of environmental recovery in urban regions that fulfills the treatment needs of sewers at micro, medium and macro scales in the entire urban hydro mesh, from the user to the river effluent, so that pollution is fully treated before being cast into watercourses in regions where the collection of waste is not efficient, thus avoiding the deterioration of riverbeds in urban regions.

Another goal of this invention is to promote a process of environmental recovery in urban regions that presents a low cost of implementation, making it feasible to adapt it to any type of watercourse.

Another goal of this invention is to promote a process of environmental recovery in urban regions that does not demand the execution of construction works in order to delimitate a large area for the treatment of polluted water from a watercourse.

Another goal of this invention is to promote a process of environmental recovery in urban regions which implementation demands slow adaptations in the section of its installation throughout the watercourse.

This and other objectives and advantages of the present invention can be achieved with a process of environmental recovery in urban regions that acts along the entire watercourse mesh of an urban region, from the canalized domestic course of sewerage systems to the urban sections of riverbed, including the following stages: from the domestic section, such as a sewerage gallery, to promote a micro application of floating or coagulating material in the watercourse to be treated, whether rainwater or sewer matter; followed by micro flocculation, so as to promote an aggregation of particles in suspension downstream, defining flakes of greater dimensions; submit those larger aggregated particles in suspension downstream in this domestic watercourse to, at least one step of dissolution and air injection, causing a micro floatation of such aggregated particles; allowing a micro aggregation of the floating material to occur downstream, which will be removed from this domestic course before it reaches a streamlet or even a river effluent; next, after the flow of water submitted to a micro treatment is thrown into a streamlet or secondary effluent (which is referred to as a regional course of water), submitted to at least one step of air injection or aeration; followed by a medium application of flocculating or coagulation material in this secondary watercourse to be treated, formed by micro treated sewers and rainwater from the fountainhead of the streamlet itself; provided that such aeration followed by a medium flocculation, so as to cause an aggregation of particles in suspension downstream, evidencing flakes of greater dimensions; to submit those larger aggregated particles downstream of this secondary watercourse to, at least, one more stage of dissolution and injection of air, causing a medium floatation of those aggregated particles and the occurrence of a medium aggregation of the floating material downstream, which is removed from this secondary course before it reaches a river effluent in its urban section; next, after the flow of the secondary watercourse is submitted to a medium treatment, it is cast into a river effluent, provided that such urban watercourse is submitted to at least one stage of air injection or aeration intercalating with successive and sequential stages of macro flocculation or coagulation, macro aeration followed by macro flocculation, with aggregation of particles in suspension, evidencing flakes of greater dimensions, which are submitted to aggregation with at least one more stage of dissolution and air injection, causing a macro floatation of such aggregated particles and allowing a macro aggregation of the floating material to occur downstream, provided that such material is removed along the urban section of the watercourse of the effluent before it reaches the water dam for urban supply.

Even though it is not yet defined, it is implied that retention and removal of solid waste is carried out at the beginning of all micro, medium and macro stages existing along the urban watercourse.

BRIEF DESCRIPTION OF THE DRAWINGS

Next, the present process of environmental recovery in urban riverbeds is to be described with reference to drawings attached hereto as examples with no limitation implied, in which:

FIG. 1 represents a sketch of an urban section of a river with its hydro mesh of domestic captivation of water and sewer, provided that such watercourse is prepared to be submitted to the process of environmental recovery in question.

FIG. 2 represents a sketch of an amplified detail, as pointed by arrow A of FIG. 1, of a domestic sector of such hydro mesh of captivation of water and sewer; and FIG. 3 represents a sketch of an amplified detail of the sequential stages of recovery of watercourses, which occur at micro, medium and macro manners, as pointed out under letter "B", in FIGS. 1 and 2.

DETAILED DESCRIPTION OF THE INVENTION

According to above mentioned illustrations, the process of environmental recovery in riverbeds of urban regions, which is the object of the present invention, comprises stages of domestic and canalized watercourse 1 of water and sewer, to be carried out with the execution of a micro process of removal of polluting materials and/or substances 20; followed by, at least, one stage of aeration 11 of the canalized watercourse until it reaches secondary watercourse 2, defined by a streamlet or totally urban secondary effluent; provided that, next, such watercourse 2 is to be submitted to a medium process of removal of polluting materials and/or substances 20a, followed by at least one stage of aeration 11 of the secondary watercourse until it reaches the riverbed in its urban section 3; next, such urban riverbed 3 is to be submitted to successive and intercalated stages of aeration 11 along its course, with macro processes of removal of polluting materials and/or substances 20b, which extend along the urban sector 3 of the course of the effluent before it reaches the water dam for water supply, which is not represented.

Each one of the removal processes of polluting materials and/or substances 20, 20a and 20b presents the same procedural stages, except for some changes regarding the treatment capacity, which is inherent and compatible with the volume of liquid to be treated, due to this treatment enhancement defined or dimensioned as micro, medium and macro environmental recovery.

In this sense, each one of the removal processes of polluting materials and/or substances 20, 20a and 20b involves the following stages: to apply flocculating or coagulating material 21 in a watercourse section 1, 2 or 3 to be treated; to allow the creation of a flocculating basin 22 along watercourses 1, 2 or 3, so as to cause an aggregation of particles in suspension 12 downstream 23, evidencing flakes of greater dimensions; to submit those coagulated particles and particles of greater dimensions 12 partially retained downstream 23 of watercourse 1, 2 or 3 to successive stages of dissolution and injection of air 11, causing a floatation of such aggregated particles 12; to allow the creation a floatation basin 24 along watercourse 1, 2 or 3, so as to cause an, aggregation of floating material 13 to be formed downstream 25, on the surface and alongside the watercourse margins 1, 2 or 3, defining the concentration of floating material 13 in a restricted area 25 of the surface of watercourse 1, 2 or 3; and promote the removal 26 of such floating material 13 retained in this surface area 25 of watercourse 1,2 or 3, as illustrated in FIG. 3.

With due regard to the proportions of watercourse 1, 2 or 3 volumes to be processed and the available space for implementation of the process 20, 20a and 20b, the distances between stages 21, 22, 11, 24 and 26 referred to above may vary, so as to require a small treatment station or a segmented treatment station, with its procedural stages 21, 22, 11, 24 and 26 distributed along the watercourses 1,2, and 3 in its urban section.

Thus, the process of environmental recovery of watercourses in urban regions as a whole is formed sequentially to act throughout all of the mesh of watercourse 1, 2 and 3 of an urban region from domestic and canalized sewerage system 1 to the riverbed 3 in its urban portion, provided that such process is to include the following stages: starting from the domestic branch 1, such as a sewer gallery, to promote a micro application of flocculating or coagulating material 21 in the watercourse 1 to be treated, whether it involves sewer or rainwater; followed by a micro flocculation 22, so as to cause an aggregation of particles downstream 23, defining flakes 12 of greater dimensions; submit those aggregated particles 12 and particles of greater dimensions downstream of this domestic course 1 of water during at least one stage of dissolution and injection of air 11, causing a micro floatation 24 of such aggregated particles; allowing the downstream occurrence of a micro aggregated floating material 13, which is removed from this domestic course 1 before it reaches a streamlet 2 or even an effluent of river 3; next, after the water flow 1, submitted to a micro treatment, is cast into a streamlet or secondary effluent 2 (referred to as a regional watercourse), submitted to a stage of air injection or aeration 11; followed by a medium application of flocculating or coagulating material 21 in this secondary watercourse 2 to be treated, formed by micro treated water and sewer and water from the riverhead of the streamlet itself; provided that such aeration 11 is followed by a medium flocculation 22, so as to cause an aggregation of particles in suspension 12, defining flakes of greater dimensions; submit those aggregated particles 12 and particles of greater dimensions downstream of this secondary watercourse 2a to at least on more stage of dissolution and injection of air 11, causing a medium floatation 24 of such aggregated particles; allowing the occurrence of a medium aggregation of floating material 13 downstream, which is removed 26 from this secondary course 2 before it reaches a river effluent in its urban sector 3; next, after the secondary watercourse 2, submitted to a medium treatment, is cast into a river effluent 3, provided that such urban watercourse is submitted to at least one stage of air injection or aeration 11 which is intercalated with successive and sequential stages of macro flocculation or coagulation 21, macro aeration 11 followed by macro flocculation 22, with aggregation of particles in suspension 12, defining flakes of greater dimensions, which are to be submitted to aggregation with at least one more stage of dissolution and injection of air 11, causing a macro flotation 24 of such aggregated particles 12, allowing the downstream occurrence of macro aggregation of floating material 13, which is removed 26 alongside the urban section 3 of the effluent watercourse before it reaches the water dam for urban supply.

In order to carry out the first stage of process 20, 20a and 20b, an application of flocculating material is initiated, provided that such application enables the removal of organic mater in suspension and, therefore, chemical products are initially added so as to cause coagulation and to aid in the coagulation process in water. After some time, such products cause an aggregation of particles in suspension 12, forming flakes of greater dimension and density which define a flocculation basin downstream of watercourses 1, 2 or 3. As seen in FIG. 3, next is a station for dissolution and injection of air 11, which enables the occurrence of the floatation process of aggregated particles 12. For instance, this station for dissolution and air injection 11 can be basically composed of water pumping units, air compressing units, mixer and clarifiers.

The necessary water sewage to be injected with micro pulverized air is 10% of the existing sewage in watercourse 1, 2 or 3. In this sense, the equipment must be dimensioned in order to fulfill the needs imposed by process 20, 20a, 20b.

After this stage, there is the retention of floating material 13 in channel 1, 2 or 3, which is made through a floating fence installed at a predefined distance from the beginning location of the process, causing the floating material 13 to be on the surface when such fence is reached, thus enabling the total captivation of the floating material 13.

The retention fence is located transversally to the location, so as to enable the concentration of floating material 13 alongside the margin, helping the process of removal.

For removal 26 of the floating material 13 of channel 1, 2 or 3, any equipment with capacity to collect the concentrated material 13 can be applied.

With this environmental recovery process in riverbeds of urban regions, great results are obtained in the treatment along river watercourses and their urban sectors 3, as well as in the maintenance treatment of secondary watercourses, such as streamlets 2, mainly those which are receptors of residual and clandestine sewerage lines 1. Additionally, it represents an extremely positive effect on the periodic, preventive and continuous watercourses 1,2 and 3 already submitted to the initial treatment to eliminate pollution, bringing about an actual life to watercourses 3, which suffer the influence of urban centers.

We claim:

1. A method for environment recovery in an urban region having a canalized domestic watercourse and sewer system comprising the steps of:

causing the formation of a flocculating basin to be formed from the canalized domestic watercourse and sewer system so as to cause the downstream aggregation of particles in suspension, defining flakes of greater dimensions;

submitting those aggregated particles and particles of greater dimensions, partially retained downstream of the watercourse to successive stages of dissolution and air injection, causing a floatation of such aggregated particles;

causing the formation of a floatation basin from the section alongside the watercourse, so as to allow the occurrence of a downstream aggregation of the floating material on the surface and alongside the watercourse margins, defining the concentration of floating material in a restricted area of the surface of the watercourse; and promoting the removal of the floating material retained in this surface area of the canalized domestic watercourse and sewer system;

aerating the canalized watercourse until it reaches a secondary watercourse defined by an urban secondary streamlet of effluent;

submitting the secondary watercourse to a medium process for removal polluting materials and/or substances;

aerating the secondary watercourse until it reaches a riverbed in the urban region;

submitting the urban riverbed to successive and intercalated aeration stages alongside its course, with macro processes of removing polluting materials and/or substances throughout the urban region of the effluent before it reaches a hydro receiving body.

2. The method defined by claim 1, wherein the medium removal processes uses the following steps to apply flocculating or coagulating material in a section of watercourse to be treated:

causing the formation of a flocculating basin to be formed from this section of the watercourse so as to cause the downstream aggregation of particles in suspension, defining flakes of greater dimensions;

submitting those aggregated particles and particles of greater dimensions, partially retained downstream of the watercourse to successive stages of dissolution and air injection, causing a floatation of such aggregated particles;

causing the formation of a floatation basin from the section alongside the watercourse, so as to allow the occurrence of a downstream aggregation of the floating material on the surface and alongside the watercourse margins, defining the concentration of floating material in a restricted area of the surface of the watercourse; and promoting the removal of the floating material retained in this surface area of the watercourse.

3. The method defined by claim 1 wherein the method is utilized throughout the entire watercourse of the urban region from the canalized domestic course of sewerage to the riverbed in its urban section, and, starting from a domestic branch such as a sewer gallery comprises:

causing an aggregation of particles in suspension downstream defining flakes of greater dimensions by a micro application of flocculating or coagulating material in the watercourse to be treated, whether it is sewer or rainwater;

submitting those aggregated particles and particles of greater dimensions downstream to the domestic course of water during at least one stage of dissolution and air injection, causing a micro flotation of the aggregated particles;

allowing a micro aggregation of the floating material to occur downstream, which is removed from this domestic course before it reaches a streamlet or a river effluent;

after the water flow is submitted to said micro treatment casting it into a streamlet or secondary effluent and submitting it to at least one stage of air injection or aeration;

followed by a medium application of flocculating or coagulating material in the secondary watercourse to be treated, formed by micro treated sewer and rainwater, as well as water from the riverhead of the streamlet itself; wherein said aeration is followed by a medium flocculation, causing an aggregation of particles in suspension downstream, defining flakes of greater dimensions;

submitting those aggregated particles and particles of greater dimensions downstream this secondary watercourse during at least one more stage of dissolution and injection of air, causing a medium floatation of such aggregated particles;

allowing a medium aggregation of the floating material to occur downstream, which it removed from this secondary course before it reaches a river effluent in its urban section;

next, after the secondary flow of water, submitted to a medium treatment is cast into a river effluent, provided that such urban watercourse is submitted to at least one stage of air injection or aeration which intercalates with successive and sequential stages of macro flocculation or coagulation, macro aeration followed by macro flocculation, with aggregation of particles in suspension, defining flakes of greater dimensions; which are submitted to aggregation after at least one more stage of dissolution and injection of air, causing a macro floatation of the aggregated particles;

causing a macro aggregation of floating material downstream, which is removed alongside the urban sector of the effluent watercourse before it reaches the hydro receiving body.

4. The method defined by claim 1, wherein the macro removal processes uses the following steps to apply flocculating or coagulating material in a section of watercourse to be treated:

causing the formation of a flocculating basin to be formed from this section of the watercourse so as to cause the downstream aggregation of particles in suspension, defining flakes of greater dimensions;

submitting those aggregated particles and particles of greater dimensions, partially retained downstream of the watercourse to successive stages of dissolution and air injection, causing a floatation of such aggregated particles;

causing the formation of a floatation basin from the section alongside the watercourse, so as to allow the occurrence of a downstream aggregation of the floating material on the surface and alongside the watercourse margins, defining the concentration of floating material in a restricted area of the surface of the watercourse; and promoting the removal of the floating material retained in this surface area of the watercourse.

* * * * *